United States Patent
Klee

[15] 3,635,248
[45] Jan. 18, 1972

[54] CONTROL ELEMENT FOR THE PNEUMATIC ESTABLISHMENT OF LOGICAL CONNECTIONS

[72] Inventor: Gerhard Klee, Frankfurt am Main-Ginnheim, Germany

[73] Assignee: Sanson-Apparatebau A.G., Frankfurt am Main, Germany

[22] Filed: Nov. 17, 1969

[21] Appl. No.: 877,409

[30] Foreign Application Priority Data

Jan. 27, 1969 Germany........................P 19 03 838.1

[52] U.S. Cl..................137/625.5, 137/81.5, 235/201 ME, 251/61.1
[51] Int. Cl. ............................................................F15c 3/04
[58] Field of Search ........................137/625.5, 625.66, 81.5; 251/61.1; 235/201 ME

[56] References Cited

UNITED STATES PATENTS

| | | | |
|---|---|---|---|
| 3,540,478 | 11/1970 | Ito.................................235/201 ME |
| 3,571,542 | 3/1971 | Madden et al. ...................137/81.5 X |
| 3,139,906 | 7/1964 | Bell et al................................137/594 |
| 2,459,527 | 1/1949 | Herbert................................251/61.1 |
| 3,202,170 | 8/1965 | Holbrook........................137/625.5 X |
| 3,303,999 | 2/1967 | Mamy............................137/625.66 X |
| 3,335,950 | 8/1967 | Tal et al. .....................137/625.66 UX |
| 3,495,611 | 2/1970 | Topfer et al. .................137/625.66 X |

Primary Examiner—Samuel Scott
Attorney—McGlew and Tuttle

[57] ABSTRACT

A control element, for the pneumatic establishment of logical connections, includes two coaxially arranged mutually interconnected diaphragms whose surfaces facing toward each other as well as whose surfaces facing away from each other can be subjected to a pressure medium. The diaphragm surfaces facing toward each other are the alternately acting switching elements of a three-way branch connection. Connecting rods interconnect the two diaphragms and extend through bores in the housing of the control element, and the diaphragms have relatively rigid plates secured thereto. A conical coil spring biases the two diaphragms to one position when no fluid pressure is effective on the control element. The active surfaces of the diaphragms subjected to a pressure medium are of substantially equal size. The control element includes a housing and a pair of covers which conjointly define diaphragm chambers connected to flow channels in the covers. Either of two inputs or outputs in the body may be connected to a third input or output by displacement of the diaphragms in one direction or the other.

5 Claims, 2 Drawing Figures

PATENTED JAN 18 1972

3,635,248

Inventor:
GERHARD KLEE

McGlew & Toren
ATTORNEYS

CONTROL ELEMENT FOR THE PNEUMATIC ESTABLISHMENT OF LOGICAL CONNECTIONS

BACKGROUND OF THE INVENTION

By means of pneumatically operated control elements, which are called static control elements in the Journal "Regelunstechnick," Volume No. 1, 1966, p. 19, it is possible to establish all logical basic functions, namely, conjunction (and), disjunction (or), negative (no), and implication (if-then), as well as inhibition, identity (amplifier) and also storage functions where a given signal is active until a countersignal is provided.

In these control elements, the switching proper is effected by alternating application, to mutually supported diaphragms, of a pressure medium, where one or the other output or input can be connected with a third output or input. The diaphragms are mutually interconnected through a traverse or connecting rod which is guided in a bore connected with the third output or input, and the end faces of the connecting rod are arranged at those surfaces of the two diaphragms which face each other. If the center tap carrying the pressure medium, which is the third input, is to be connected, for example, with the left output of the three-way system, the right diaphragm must have a controlling pressure medium applied to its outer surface. The greatest closing force of the diaphragm, with respect to the end face of the bore guiding the traverse and facing the diaphragm, which is to be closed in the present example, exists when the cross-sectional area of the end face of the bore is as small as possible. But if, inversely, a connection between the center tap and the right output has to be interrupted, a very large cross-sectional area at this end face of the bore yields the greatest closing force of the diaphragm.

In order to arrive at useful ratios, the cross-sectional areas of the end faces of the bores are selected, in practice, to be about half the size of the corresponding diaphragm surfaces, so that comparable closing forces are obtained in both cases. This is a disadvantage insofar as the end faces of the bore, which are also called nozzles, cannot be selected arbitrarily small, so that a certain minimum size, and thus a certain minimum space requirement, of these control elements must be maintained. In addition, the connecting channels or conduits lead from four sides of the control element into the housing, so that a series connection of the housing is not possible.

Pneumatic control and regulating circuits are very voluminous, however, as a rule, particularly in the case of automatic plants in the processing industry or in mass production. The control elements, used in great numbers, should therefore be as small and as inexpensive as possible, and nevertheless work reliably and permit series arrangement.

Another disadvantage resides in the fact that, in case of failure of the controlling pressure medium, the control element assumes an indefinite or undefined position. It is thus not possible, using such control elements, to lay out circuits so that in case of failure of the controlling pressure medium, the safety of the controlling plant or of the controlled plant is insured.

There is already known a pneumatic control element having a rocker arranged in a two-chamber housing, and wherein one arm of the rocker can close alternately one or the other output of a three-way branch, while the other arm of the rocker is clamped between a spring and a diaphragm, this pneumatic control element being supplied alternately by a controlling pressure medium (see "Regelungstechnick," Vol. No. 1, 1966, p. 19). Although a defined switching position, within the three-way system, is provided by the spring, the construction is more complicated and more expensive, compared to the first mentioned control elements, apart from the fact that the connecting channels lead from three sides into the housing, so that a compact assembly of these control elements likewise is not possible.

SUMMARY OF THE INVENTION

This invention relates to a control element for pneumatic establishment of logical connections and, more particularly, to a novel, improved, simplified and more compact control element of this type particularly adapted for series arrangement.

The objective of the invention is to provide a new, universally applicable pneumatic control element for the establishment of logical connections, and which requires little space but is nevertheless simple and inexpensive in its construction and is completely reliable, which permits a compact assembly of many control elements, and which has a defined switching position in case of failure of the controlling pressure medium.

Starting from a control element of the type mentioned above, having a diaphragm-controlled three-way branch, the present invention solves the problem by providing respective active surfaces of the diaphragms, subjected to the pressure medium, which are of equal or substantially equal size or area.

The cross-sectional areas of the openings of the three-way system, facing the diaphragms, are smaller than the surfaces of the diaphragms facing each other and acting as switching elements and which are subjected to the pressure medium.

In accordance with another feature of the invention, the mutually interconnected diaphragms are maintained elastically in a certain switching position, preferably in one of the two possible switching positions, by means of a spring which preferably is a conical spiral spring.

In further accord with the invention, all the connecting channels open through a single connection side of the control element, with the connecting channels being arranged at diagonally opposite intersections of a square raster or grid network.

The diaphragms are interconnected by at least two traverses or connecting rods arranged symmetrically but eccentrically with respect to the gravity line of the diaphragms.

Those surfaces of the diaphragms facing each other can by the closing surfaces of respective openings of the three-way branch, but it is also possible to connect the surfaces of the diaphragms, facing each other, with a separate sealing plate which plates are formed of a material different from that of the diaphragms.

In accordance with the preferred embodiment of the invention, the control element includes a square housing having oppositely arranged covers forming parts of the diaphragm chambers and each of which covers has a connecting channel extending at a right angle to the direction of motion of the diaphragms. That part of the housing carrying the covers has recesses corresponding with the covers and complementing the diaphragm chambers which have, at their centers, nozzle-shaped openings connected with the connecting channels and, eccentrically thereto, openings connected with the connecting channel serving as a center tap and receiving the traverses or connecting rods. All the connecting channels extend in the same direction to the outer surface of the control element. Such a control element, which is also called a microswitch, has a novel compact design. The center tap serves, in the control element, to relieve the diaphragms. The closing forces of the diaphragms, resulting in each switching operation, with respect to the associated nozzles, is the greater the smaller the cross-sectional area of the nozzles is. The nozzles can be made so small, however, as just necessary for the passage of the pressure medium. Thereby, rapid-switching operations are made possible. Another advantage is that the diaphragms themselves can have a smaller diameter, so that the dimensions of the housing may likewise be made very small. In addition, the arrangement of the connections on a single surface of the housing permits a close arrangement of the individual housings without interfering connecting lines. The construction of complicated circuits thus becomes considerably simpler and more compact, which is favorable from the standpoint of maintenance.

An object of the invention is to provide an improved universally applicable control element for the pneumatic establishment of logical connections.

Another object of the invention is to provide such a control element which is compact, simple and inexpensive, as well as being completely reliable.

A further object of the invention is to provide such a control element which permits a compact assembly of several control elements.

Another object of the invention is to provide such a control element which has a defined switching position in case of failure of the controlling pressure medium.

A further object of the invention is to provide such a control element in which the respective active surfaces of a pair of diaphragms subjected to pressure medium are substantially equal in size.

Another object of the invention is to provide such a control element including a housing and flow channels in the housing, all of the flow channels opening through the same outer surface of the housing.

For an understanding of the principles of the invention, reference is made to the following description of a typical embodiment thereof as illustrated in the accompanying drawings.

DESCRIPTION OF THE PREFERRED EMBODIMENT

Figure 1:
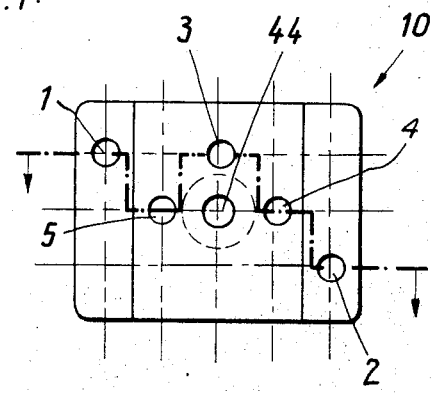
FIG. 1 is a bottom plan view of a control element embodying the invention.

Referring to the drawings, the control element comprises a substantially square cross section housing 10, formed with connecting channels 1, 2, 3, 4 and 5 opening through one side. Housing 10 comprises three housing parts, including a main part 31 and two housing covers 32 and 33, which are interconnected by screws which have not been represented in the drawings. A pair or openings 34 and 35, acting as nozzles, are connected to respective inputs 5 and 4 and extend at right angles to these inputs substantially along the longitudinal centerline of main housing part 31.

Figure 2:
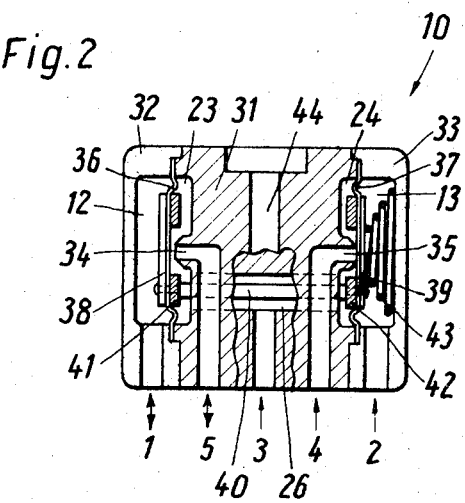
FIG. 2 is a sectional view along the line II—II of FIG. 1, through the housing of the control element.

Each of two diaphragms 36 and 37 is clamped between a respective cover 36 and 37 and main housing part 31, the covers forming parts of respective diaphragm chambers 12 and 13 which are connected with connecting channels 1 and 2, respectively, extending perpendicularly to the direction of motion of the diaphragms. The diaphragms bear against respective diaphragm plates 38 and 39, and serve as sealing means for closing the respective openings 34 and 35. Thus, the diaphragms serve as switching elements of the three-way branch, to be described, in housing part 31. Diaphragm plates 38 and 39 are maintained at a required fixed distance from each other by two connecting bars or traverses 40, of which only one is shown in FIG. 2. These connecting bars or traverses have their opposite ends riveted to the diaphragm plates 38 and 39 with the interposition of respective rings 41 and 42.

The main part 31 of housing 10, having the covers 32 and 33 secured thereto, has, on its sides facing the covers, the mentioned recesses 23 and 24 complementing diaphragm chambers 12 and 13 having, at their centers, the respective openings or nozzles 34 and 35. Eccentrically of the common axis of openings 34 and 35, but symmetrically with respect to the gravity line of the diaphragms, there are provided, in each diaphragm chamber, openings of bores 26, through which there extend the traverses or connecting bars or rods 40. At least one of the bores 26 is connected with connecting channel 3, which forms the center tap of the three-way branch, constituted by input 3, bore 26, diaphragm chambers 23 and 24, openings 34 and 35, and connecting channels 4 and 5. Bores 26 also can be designed as slots accommodating the traverses or connecting bars.

A conical spiral spring is arranged between diaphragm plate 39 and cover 33, and biases diaphragm 37, in the absence of pressure medium, preferably compressed air, against opening 35 so that the latter is closed. The force of spring 43 is so selected that it is about one-half the magnitude of the force of the normally applied air pressure acting on the diaphragms.

As best seen in FIG. 1, all the connecting channels open through one side of the housing, and are arranged at the diagonally opposite intersections of a square raster or grid network as shown by the lightweight chain lines in FIG. 1. The smallest distance between two connections is thus equal to the diagonal of the square forming the basis of the grid. This makes it possible to arrange the connecting lines (not shown), despite a sufficient spacing from each other, in a minimum space. In the center of the grid network there is provided a bore 44 for mounting the control element.

As will be clear from the foregoing considerations, the connections 3, 4, and 5 of the three-way branch of the control element can be connected alternately with each other by means of a controlling pressure medium, preferably compressed air, which can be supplied to connections 1 or 2. If air pressure is present, for example, in connection 1, it effects closing of opening 34 by diaphragm 36, and operates diaphragm 37 to open opening 35 against the bias of spring 43. A pressure medium supplied to connection 3, and which is preferably compressed air, can thus flow through bore 26, recess 24, opening 35 and connecting channel 4. In a corresponding manner, center tap 3 also can be connected with connecting channel 5, etc. In the case of failure of the controlling pressure medium, the diaphragms assume the position shown in FIG. 2, under the bias of spring 43.

Without departing from the spirit of the invention, certain changes may be made in the illustrated embodiment. Thus, conical spiral spring 43 may be replaced by a different type of spring. Also, valvelike plates of harder or softer material than diaphragms 36 and 37 may be provided for closing openings 34 and 35. In addition, openings 34 and 35 can be interchanged with the openings of the bores 26.

While the specific embodiment of the invention has been shown and described in detail to illustrate the application of the principles of the invention, it will be understood that the invention may be embodied otherwise without departing from such principles.

What is claimed is:

1. In a control element for the pneumatic establishment of logical connections, of the type including two coaxially arranged mutually interconnected diaphragms, whose surfaces facing toward each other as well as whose surfaces facing away from each other can be subjected to a pressure medium, with the diaphragm surfaces facing toward each other being alternately acting switching elements of a three-way branch connection including a center tap and two branch taps; the improvement comprising said center tap being positioned to apply pressure to annular surfaces of said diaphragms spaced radially from the centers of said diaphragms; said branches being positioned to apply pressure to the inner surfaces of said diaphragms substantially centrally thereof and being opened or closed in accordance with the respective switching position of said diaphragms.

2. In a control element for the pneumatic establishment of logical connections, of the type including two coaxially arranged mutually interconnected diaphragms, whose surfaces facing toward each other as well as whose surfaces facing away from each other can be subjected to a pressure medium, with the diaphragm surfaces facing toward each other being alternately acting switching elements of a three-way branch connection: the improvement comprising the corresponding surfaces of each of the diaphragms subjected to pressure medium being substantially equal in area; a housing formed with connection channels of said three-way branch connections; all said connection channels opening through the same single surface of said housing and having exterior openings arranged on said same single surface at diagonally opposite intersections of a square grid network defined, at least in part, by said exterior openings.

3. In a control element for the pneumatic establishment of logical connections, of the type including two coaxially arranged mutually interconnected diaphragms, whose surfaces facing toward each other as well as whose surfaces facing away from each other can be subjected to a pressure medium, with the diaphragm surfaces facing toward each other being alternately acting switching elements of a three-way branch connection: the improvement comprising the corresponding surfaces of each of the diaphragms subjected to pressure medium being substantially equal in area; a housing formed with connection channels of said three-way branch connection; all said connection channels opening through the same single surface of said housing; the exterior openings of said connection channels being arranged on said same single surface of said housing at diagonally opposite intersections of the square grid network; and a housing mounting portion at the center of said grid network.

4. In a control element for the pneumatic establishment of logical connections, of the type including two coaxially arranged mutually interconnected diaphragms, whose surfaces facing toward each other as well as whose surfaces facing away from each other can be subjected to a pressure medium, with the diaphragm surfaces facing toward each other being alternately acting switching elements of a three-way branch connection: the improvement comprising the corresponding surfaces of each of the diaphragms subjected to pressure medium being substantially equal in area; and at least two symmetrically positioned crossbars interconnecting said diaphragms and arranged eccentrically to the gravity line of said diaphragms.

5. In a control element for the pneumatic establishment of logical connections, of the type including two coaxially arranged mutually interconnected diaphragms, whose surfaces facing toward each other as well as whose surfaces facing away from each other can be subjected to a pressure medium, with the diaphragm surfaces facing toward each other being alternately acting switching elements of a three-way branch connection: the improvement comprising the corresponding surfaces of each of the diaphragms subjected to pressure medium being substantially equal in area; a substantially square cross section housing; a pair of covers secured to opposite sidewalls of said housing and each forming part of a diaphragm chamber for a respective diaphragm; each cover having formed therein a connecting channel extending perpendicularly to the direction of motion of said mutually interconnected diaphragms and communicating with the respective diaphragm chamber part; those surfaces of said housing having said covers secured thereto being formed with recesses corresponding with the covers and complementing said diaphragm chambers; each of said recess having a centrally arranged, nozzle-shaped opening connected to a respective one of two connecting channels in said housing; each recess having formed eccentrically therein at least one respective end opening of at least one respective bore interconnecting said diaphragm chambers; a third connecting channel formed in said housing and communicating with at least one of said bores; and at least one crossbar interconnecting said diaphragms and disposed in a bore; all of said connecting channels extending in the same direction to the exterior of said housing.

* * * * *